United States Patent [19]

Shiga et al.

[11] Patent Number: 4,551,501

[45] Date of Patent: Nov. 5, 1985

[54] CRYSTALLINE PROPYLENE POLYMER COMPOSITION

[75] Inventors: Akinobu Shiga, Tokyo; Masahiro Kakugo, Chiba; Junpei Kojima, Chiba; Kizuku Wakatsuki, Chiba, all of Japan

[73] Assignee: Sumitomo Chemical Company, Limited, Osaka, Japan

[21] Appl. No.: 686,866

[22] Filed: Dec. 27, 1984

[30] Foreign Application Priority Data

Dec. 27, 1983 [JP] Japan ................................ 58-248520

[51] Int. Cl.$^4$ ...................... C08L 23/12; C08L 23/14; C08L 53/00
[52] U.S. Cl. ........................................ 525/88; 525/89; 525/95; 525/216; 525/297
[58] Field of Search ..................... 525/216, 95, 89, 88, 525/297

[56] References Cited

U.S. PATENT DOCUMENTS 3,707,520 12/1972 Pampus et al. ...................... 525/297
3,888,949 6/1975 Shih ........................................ 525/95

FOREIGN PATENT DOCUMENTS 1030797 5/1966 United Kingdom .

OTHER PUBLICATIONS

Journal of Polymer Science, vol. XXXIX, Issue 135, (1959), "Nucleation Effects in High Polymers", pp. 543–545.

Primary Examiner—Carman J. Seccuro
Attorney, Agent, or Firm—Sughrue, Mion, Zinn, Macpeak, and Seas

[57] ABSTRACT

A crystalline propylene polymer composition having excellent transparency and rigidity comprising a blend of a crystalline polypropylene with a polymer of a vinyl cycloalkane having at least 6 carbon atoms. The composition contains 0.05 weight ppm to 10,000 weight ppm of the vinyl cycloalkane unit.

10 Claims, 1 Drawing Figure

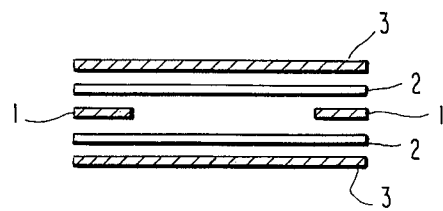

CRYSTALLINE PROPYLENE POLYMER COMPOSITION

FIELD OF THE INVENTION

This invention relates to a propylene polymer composition having excellent crystallinity.

BACKGROUND OF THE INVENTION

A polypropylene is a synthetic resin which has high rigidity and mechanical strength but of which rate of crystallization is relatively slow. In some applications, therefore, its crystallinity after molding is low and its rigidity is reduced accordingly. Or because of the formation of relatively large spherulites, molded articles of the polymer have inferior transparency and may have a debased commercial value.

Some attempts have been made heretofore to improve the crystallinity and transparency polypropylene. For example, it is known that when an aluminum or sodium salt of an aromatic carboxylic acid (Japanese Laid-open Patent Publication No. 80329/1983) or an aromatic carboxylic acid, an aromatic metal phosphate or a sorbitol derivative (Japanese Patent Publication No. 12460/1980 and Japanese Laid-Open Patent Publication No. 129036/1983) is added, it becomes an agent for forming a crystal nucleus (to be referred to as a nucleating agent), and reduces the aforesaid problem. Among these nucleating agent, the sorbitol derivative exhibits a particularly good nucleating effect, but is limited in its use because it bleeds out from the resin to contaminate rolls during film formation and give an offensive odor during processing. The aluminum salt of an aromatic carboxylic acid which is frequently used in general acts as a nucleating agent, but has a very small effect of improving the transparency of the polypropylene. Furthermore, a film formed from a polypropylene containing this aluminum salt develops numerous voids.

Japanese Patent Publication No. 32430/1970 describes that to improve the transparency of polypropylene, a three-component copolymer is prepared by copolymerizing propylene, an α-olefin having 4 to 18 carbon atoms and 3-methylbutene-1. The transparency of this copolymer is still unsatisfactory. Even when such a 3-methylbutene-1 copolymer is blended with a polypropylene, the effect of improving the transparency of the polypropylene is unsatisfactory.

SUMMARY OF THE INVENTION

In view of these defects, the present inventors have made extensive investigations, and have found that the crystallinity and transparency of a polypropylene can be improved by blending a crystalline polypropylene with a vinyl cycloalkane polymer. This discovery has led to the present invention.

According to this invention, there is provided a crystalline propylene polymer composition comprising a blend of a crystalline polypropylene with a polymer of a vinyl cycloalkane having at least 6 carbon atoms, said composition containing 0.05 weight ppm to 10,000 weight ppm of the vinyl cycloalkane unit.

BRIEF DESCRIPTION OF THE DRAWING

FIG. 1 shows a schematic view of a pressing plate to mold a sample sheet for the measurement of optical properties.

DETAILED DESCRIPTION OF THE INVENTION

The crystalline polypropylene, as used in this invention, denotes a homopolymer of propylene or a random or block copolymer of propylene with another α-olefin having 2 to 18 carbon atoms. Examples of another α-olefin having 2 to 18 carbon atoms include ethylene, butene-1, pentene-1, hexene-1, and octene-1. An amount of another α-olefin which is copolymerized with propylene is up to 50 mole% per mole of propylene.

The vinyl cycloalkane polymer denotes a homopolymer of a vinyl cycloalkane having at least 6 carbon atoms or a random copolymer of the vinyl cycloalkane with a small amount (i.e., up to 20 mole% per mole of the vinyl cycloalkane) of another vinyl cycloalkane or an α-olefin or a block copolymer of the vinyl cycloalkane with an α-olefin. Examples of the α-olefin which is copolymerized with the vinyl cycloalkane are α-olefins having 2 to 8 carbons such as ethylene, propylene, and butene-1. The vinyl cycloalkane block copolymer denotes a copolymer of the vinyl cycloalkane with various α-olefins obtained by multi-step polymerization, for example (1) a copolymer obtained by polymerizing the vinyl cycloalkane in a first step and homopolymerizing propylene in a second step, (2) a copolymer obtained by polymerizing the vinyl cycloalkane in a first step and random copolymerizing propylene with another α-olefin in a second step, and (3) a copolymer obtained by homopolymerizing propylene in a first step, polymerizing the vinyl cycloalkane in a second step, and homopolymerizing propylene or copolymerizing propylene with another α-olefin in a third step. Of these vinyl cycloalkane polymers, the block copolymers are preferred, and the block copolymers of the vinyl cycloalkane with propylene as shown in (1) to (3) are more preferred.

Examples of the vinyl cycloalkane having at least 6 carbon atoms used to prepare the vinyl cycloalkane polymer include vinyl cyclobutane, vinyl cyclopentane, vinyl-3-methyl cyclopentane, vinyl cyclohexane, vinyl-2-methyl cyclohexane, vinyl-3-methyl cyclohexane and vinyl norbornane, with vinyl cyclopentane and vinyl cyclohexane being preferred. Examples of another vinyl cycloalkane to be copolymerized with the vinyl cycloalkane are those listed above for the vinyl cycloalkane.

In order to obtain the improving effect without changing the inherent properties of the crystalline polypropylene, the content of the vinyl cycloalkane unit in the crystalline propylene polymer composition of this invention should be 0.05 to 10,000 weight ppm, preferably 0.5 to 5,000 weight ppm, more preferably 0.5 to 1,000 weight ppm.

The crystalline polypropylene and the vinyl cycloalkane polymer used in this invention can be conveniently produced by using a catalyst system composed of a titanium compound and an organoaluminum compound. That is, homopolymerization of propylene or copolymerization of it with another α-olefin may be carried out by known polymerization methods, for example, by slurry polymerization in a hydrocarbon solvent such as hexane or heptane, bulk polymerization in liquefied propylene, vapor-phase polymerization in a propylene gas, etc. The copolymerization of propylene with another α-olefin may be random copolymerization or block copolymerization. The polymerization temperature is 20° C. to 100° C., and the polymerization pressure is atmospheric pressure to 60 kg/cm²-G. Further, the homopolymerization of the vinyl cycloalkane or the copolymerization of it with another vinyl cycloalkane or with an α-olefin may be carried out preferably in the presence of a polymerization solvent. Suitable polymerization solvents include the above vinyl cycloalkane monomers themselves and hydrocarbons such as butane, hexane, heptane, benzene and toluene. The polymerization temperature is 20° C. to 100° C., and the polymerization pressure is atmospheric pressure to 60 kg/cm²-G. Examples of the titanium compound are the titanium trichloride catalysts sold by Toyo Stauffer Co., Ltd., Toho Titanium Co., Ltd., and Marubeni-Solvay Co., Ltd. The catalysts comprising magnesium compounds and titanium compounds supported thereon which are described in, for example, Japanese Laid-Open Patent Publication Nos. 59916/1982 and 133408/1980 may also be conveniently used.

The organoaluminum compound is preferably alkyl aluminum compound represented by the following formula:

wherein X represents a halogen atom, an alkoxy group or a hydrogen atom, R represents an alkyl group having 1 to 18 carbon atoms, and a is a number represented by $0 \leq a < 3$. Specific examples of the organoaluminum compound include $Al(CH_3)_3$, $Al(C_2H_5)_3$, $Al(C_2H_5)_2Cl$, $Al(C_2H_5)_2Br$, $Al(C_2H_5)_2(OC_2H_5)$, $Al(C_2H_5)_2(OC_4H_9)$, $Al(C_2H_5)(OC_4H_9)_2$, $Al(C_2H_5)Cl_2$, $Al(C_4H_9)_3$, $Al(C_4H_9)_2Cl$, $Al(C_6H_{13})_3$, $Al(C_6H_{13})_2Cl$ and mixtures thereof.

To improve the stereoregularity of the crystalline polypropylene or the vinyl cycloalkane polymer, it is possible to add an electron donor such as carboxylic acid esters, phosphoric acid esters or silicic acid esters during the polymerization.

The crystalline polypropylene and the vinyl cycloalkane polymer can be blended by methods usually employed in blending α-olefin polymers. Specifically, the powders of the two polymers, the pellets of two polymers, or a powder of one polymer and pellets of the other polymer may be mixed in a Henschel mixer or the like, and melted and kneaded by a Brabender, a roll, a Banbury mixer, a granulator, etc.

As required, all types of additives normally incorporated in polypropylenes, such as heat and light stabilizers, antistatic agents, antioxidants, carbon black, pigments and flame retardants, may be added to the crystalline propylene polymer composition of this invention. Furthermore, the composition of this invention may be mixed with another polymer such as low-density polyethylene, high-density polyethylene, polybutene or EP (ethylene/propylene) rubber and filler such as mica and talc The crystalline propylene polymer composition of this invention may be molded into a variety of products such as sheets, films, containers and fibers by known techniques such as injection molding, pressure forming, vacuum forming, extrusion molding, blow molding and stretching.

The following examples illustrate the present invention specifically. It should be noted however that the invention is in no way limited to these examples.

The various properties including the melt index, light scattering index (LSI), haze, gloss, [η], and crystallization temperature shown in these examples were measured by the following examples.

(1) Melt index:
Measured in accordance with JIS K-6758.
(2) [η]:
Measured at 135° C. in tetralin using an Ubbelohde's viscometer.
(3) Crystallization temperature:
Measured at a temperature falling speed of 4° C./min. by means of a differential scanning calorimeter (DSC).
(4) Light scattering index (LSI):
Measured by an LSI tester made by Toyo Seiki K.K. (receiving scattering transmitting light of 1.2° to 3.6°).
(5) Haze:
Measured in accordance with ASTM D1003.
(6) Gloss:
Measured in accordance with ASTM D532-53T.
(7) Total light transmittance:
Measured by ASTM-D1746-62T.
(8) Internal haze:
The sample sheet was immersed in dimethyl phthalate, and its internal haze was measured in accordance with ASTM D1003.
(9) Internal total light transmittance:
The sample sheet was immersed in dimethyl phthalate, and its internal total light transmittance was measured in accordance with ASTM D1745-62T.
(10) Flexural modulus:
Measured in accordance with ASTM D790-66 on a sample having a thickness of 5.0 mm obtained by compression molding in accordance with JIS K-6758.

Sample sheets for the measurement of the optical properties (4) to (9) were prepared in accordance with the pressing temperature, pressure and time conditions indicated in JIS K-6758 by using the pressing plate shown in FIG. 1, i.e., a resin sample was put into a space surrounded by a 1 mm-thick stainless plate 1 and a 1 mm-thick aluminum plate 2 and then pressed to prepare the sample sheet. A numeral 3 represents a 1 mm-thick stainless steel plate.

EXAMPLE 1

(1) Synthesis of a copolymer of vinyl cyclohexane and propylene

To 100 ml of dehydrated and purified n-heptane were successively added 1.95 g of triethyl aluminum, 675 mg of ethyl p-anisate and 6.0 g of a titanium compound catalyst synthesized in accordance with Example 1 of Japanese Laid-Open Patent Publication No. 59916/1982. The mixed solution was then heated to 50° C., and then 50 ml of vinyl cyclohexane was added. The vinyl cyclohexane was polymerized for 15 minutes. The resulting polymer slurry was washed four times with 200 ml of n-heptane to remove the unreacted vinyl cyclohexane, triethyl aluminum and ethyl p-anisate. The n-heptane was removed from the washed active slurry by distillation under reduced pressure to obtain 7.8 g of a powder of polyvinyl cyclohexane containing the active catalyst. The amount of polyvinyl cyclohexane formed was 0.30 g per gram of the charged titanium compound catalyst.

By using 1.06 g of the vinyl cyclohexane polymerization catalyst, 0.75 g of triethyl aluminum, 0.237 g of methyl p-toluate and 1500 ml of n-heptane, propylene was polymerized in a 5-liter stainless steel autoclave at a temperature of 70° C. under a pressure of 6 kg/cm²-G for 40 minutes using hydrogen in a concentration of 1.5% by volume. After the polymerization, 50 ml of n-butanol was added to stop the polymerization. The polymer slurry was taken out, and filtered to separate the polymer powder from the solvent. The polymer powder was washed with 500 ml of 1N hydrochloric acid and then with methanol until the washings became neutral. The powder was dried and then weighed. Its amount was found to be 840 g. The amount of propylene polymerized was 1030 g per gram of the titanium compound catalyst. The powdery copolymer had an [η] of 1.93 dl/g. The vinyl cyclohexane unit content of the copolymer powder, calculated from the amount of vinyl cyclohexane polymerized per gram of the titanium compound catalyst, was 290 weight ppm.

(2) Preparation of a propylene polymer composition and a molded article

One hundred parts by weight of propylene homopolymer having a melt index of 1.0 was mixed with 0.5 part by weight of the copolymer prepared in (1) above, 0.2 part by weight of BHT (2,6-di-tertiary butyl hydroxytoluene) and 0.05 part by weight of calcium stearate as stabilizers and 0.05 part by weight of Irganox ® 1010 (antioxidant made by Ciba-Geigy AG; tetrabis[methylene-3(3′,5′-di-t-butyl-4-hydroxyphenyl)propionate]methane) by a Henschel mixer. The mixture was pelletized by a usual method using an extruder having a screw diameter of 40 mm. The pellets were melted and pressed by a hot press-forming machine kept at 230° C., and then cooled by a cold press having water at 30° C. circulated therethrough, to form a sheet having a thickness of 1 mm. The press sheet was quite odor-free, and had a haze of 63.0%, an LSI of 0.2% and a gloss of 95%. The composition had a crystallization temperature of 126.8° C.

EXAMPLES 2 TO 4

Example 1 was repeated except that the amount of the vinyl cyclohexane copolymer blended was changed to 1 part by weight (Example 2), 2 parts by weight (Example 3) or 10 parts by weight (Example 4). The crystallization temperatures, LSI and haze values of the products are shown in Table 1.

COMPARATIVE EXAMPLE 1

For comparison, the haze, LSI, gloss and crystallization temperature of a press sheet of propylene homopolymer in the absence of the copolymer obtained in Example 1-(1) were measured. They were 52.5%, 40.5%, 74%, and 116.5° C., respectively.

TABLE 1

| Example (Ex.) or Comparative Example (CEx.) | Content of Polyvinyl Cyclohexane (wt. ppm) | Crystallization Temperature (°C.) | Difference in Crystallization Temperature (°C.) | Sum of Haze and Gloss (%) |
|---|---|---|---|---|
| Ex. 1 | 1.5 | 126.8 | 10.3 | 63.2 |
| Ex. 2 | 3 | 127.0 | 10.5 | 55.0 |
| Ex. 3 | 6 | 126.6 | 10.1 | 51.0 |
| Ex. 4 | 29 | 130.0 | 13.5 | 37.5 |
| CEx. 1 | — | 116.5 | — | 93.0 |

The data given in Table 1 demonstrate that the polyvinyl cyclohexane-containing polypropylene has a high crystallization temperature, a marked small light scattering intensity of the transmitted light and excellent transparency.

EXAMPLES 5 AND 6

To a mixture of 10 ml of n-heptane and 5 ml of vinyl cyclohexane were added 0.157 g of titanium trichloride (a product of Marubeni-Solvay Co., Ltd.) and 0.3 g of triethyl aluminum, and the vinyl cyclohexane was polymerized at 50° C. for 45 minutes. The polymerization was stopped by adding methanol. The product was washed with HCl-methanol to give 2.5 g of polyvinyl cyclohexane. The resulting polyvinyl cyclohexane (0.1 g in Example 5, and 0.01 g in Example 6) was dissolved in 20 ml of carbon tetrachloride. The solution was uniformly impregnated in 20 g of a powder of propylene homopolymer having a melt index of 27. The carbon tetrachloride was then removed by drying under reduced pressure. The residue was kneaded by a roll with the same proportions of the stabilizers and antioxidant (BHT, calcium stearate and Irganox ® 1010) as used in Example 1. The optical properties and crystallization temperature of the resulting propylene polymer composition were measured. The results are shown in Table 2 together with those values of propylene homopolymer without the blending of polyvinyl cyclohexane (Comparative Example 2). It is seen that the blends of a homopolymer of vinyl cyclohexane and propylene homopolymer also exhibited improved transparency and gloss.

TABLE 2

| Example (Ex.) or Comparative Example (CEx.) | Content of Polyvinyl Cyclohexane (wt. ppm) | Crystallization Temperature (°C.) | Haze (%) | LSI (%) | Gloss (%) |
|---|---|---|---|---|---|
| Ex. 5 | 5,000 | 130.9 | 63.5 | 1.6 | 85 |
| Ex. 6 | 500 | 129.9 | 60.4 | 0 | 88 |
| CEx. 2 | — | 120.6 | 66.0 | 27 | 71 |

COMPARATIVE EXAMPLE 3

A copolymer of 4-methylpentene-1 and propylene was synthesized as in Example 1 except that 4-methylpentene-1 was used instead of vinyl cyclohexane.

One hundred parts by weight of the propylene homopolymer having a melt index of 27 shown in Comparative Example 2 (crystallization temperature: 120.6° C., haze: 66%, gloss: 71%) was mixed with 0.5 part by weight of the above copolymer to give a propylene polymer composition containing 122 ppm of 4-methylpentene-1 unit. A press sheet formed from this composition had a haze of 71.4%, an LSI of 20.0%, a gloss of 75% and a crystallization temperature of 122.0° C. The difference of this crystallization temperature from that of the propylene homopolymer was 1.4° C. It was found that poly-4-methylpentene-1 hardly showed a nucleating action and did not show a substantial improvement of the transparency of the propylene polymer.

EXAMPLE 7

To 20 ml of dehydrated and purified n-heptane were successively added 0.6 millimole of diethyl aluminum chloride and 1.10 g of the titanium trichloride catalyst (a product of Marubeni-Solvay Co., Ltd.). The mixed solution was heated to 60° C. Then, 10 ml of vinyl cyclohexane was added and polymerized for 15 minutes. There are obtained a catalyst containing 1.26 g of polymerized vinyl cyclohexane per gram of the titanium trichloride catalyst. Propylene was homopolymerized in the same way as in Example 1 using the resulting catalyst and diethyl aluminum chloride to give polypropylene containing 0.14% by weight of vinyl cyclohexane unit and having an [η] of 2.2 dl/g.

The resulting copolymer (0.5 part by weight) was added to 100 parts by weight of propylene homopolymer having a melt index of 0.5 (crystallization temperature: 118.3° C., a 1 mm-thick press sheet prepared from the propylene homopolymer had a haze of 54.3%, an LSI of 41.0% and a gloss of 69%), and the same stabilizers and antioxidant as in Example 1 were added. They were kneaded by a Brabender to give a crystalline propylene polymer composition containing 7 weight ppm of the vinyl cyclohexane polymer. The composition had a crystallization temperature of 130.2° C. which was higher by 11.9° C. than that of the propylene homopolymer. A 1 mm-thick press sheet prepared from the composition showed a haze of 50.1%, an LSI of 2.0% and a gloss of 80%, respectively.

EXAMPLE 8

A propylene copolymer having an [η] of 6.0 dl/g and containing 2.22% by weight of vinyl cyclohexane unit was produced in the same way as in Example 7 by polymerizing 4.88 g of vinyl cyclohexane per gram of the titanium trichloride catalyst in a first step and homopolymerizing propylene in a second step. The resulting copolymer (2% by weight) was blended with 98% by weight of the same propylene homopolymer (MI 0.5) as used in Example 7 in the same way as in Example 7 to give a propylene polymer composition. The optical properties of the composition were measured and the results are shown in Table 3.

COMPARATIVE EXAMPLES 4 TO 10

For comparison, in each run, a composition composed of the propylene homopolymer and a propylene copolymer containing 0.3 to 2.0 g of each of the vinyl compounds shown in Table 3 polymerized per gram of the titanium trichloride catalyst was prepared in the same way as in Example 7 except that the aforesaid vinyl compound was used instead of vinyl cyclohexane. The optical properties of the composition were measured, and the results are shown in Table 3.

COMPARATIVE EXAMPLES 11 TO 14

In each run, the same procedure as in Example 7 was repeated except that allylbenzene or styrene was used instead of vinyl cyclohexane, and when allylbenzene or styrene was polymerized, triethyl aluminum was used instead of diethyl aluminum chloride. The optical properties of the resulting composition were measured, and the results are shown in Table 3.

The results in Comparative Example 3 and Comparative Examples 4 to 14 show that even though a high melting polymer (poly-4-methylpentene-1: 238° C., poly-3-methylbutene-1: 303° C., polyvinyl cyclohexane: 418° C., poly-3-methylpentene-1: 273° C., polyallylbenzene: 208° C., polystyrene: 242° C.) is merely contained in polypropylene, the optical properties of the polypropylene cannot be improved.

TABLE 3

| Example (Ex.) or Comparative Example (CEx.) | Vinyl compound/propylene copolymer | | | Content of vinyl compound in the composition (wt. ppm) | Optical Properties | | | |
|---|---|---|---|---|---|---|---|---|
| | Vinyl compound | [η] (dl/g) | Blending Amount (%) | | Haze (%) | LSI (%) | Total Light transmittance (%) | Gloss (%) |
| Base polypropylene | — | — | — | — | 54 | 41 | 86 | 69 |
| Ex. 7 | Vinyl cyclohexane | 2.2 | 0.5 | 7 | 50 | 2 | 86 | 80 |
| Ex. 8 | " | 6.0 | 2 | 444 | 30 | 1 | 86 | 98 |
| CEx. 4 | 3-Methylbutene-1 | 1.86 | 0.5 | 2 | 82 | 7 | 90 | 72 |
| CEx. 5 | " | " | 2 | 8 | 82 | 4 | 91 | 77 |
| CEx. 6 | " | " | 50 | 200 | 80 | 4 | 87 | 75 |
| CEx. 7 | Vinyl cyclohexene | 1.9 | 0.5 | 3 | 74 | 18 | 89 | 68 |
| CEx. 8 | " | " | 50 | 300 | 85 | 10 | — | — |
| CEx. 9 | 3-Methylpentene-1 | 2.0 | 0.5 | 10 | 75 | 7 | 88 | 74 |
| CEx. 10 | " | " | 50 | 1000 | 82 | 3 | 85 | 66 |
| CEx. 11 | Allylbenzene | 2.0 | 0.5 | 75 | 65 | 29 | 88 | 60 |
| CEx. 12 | " | " | 50 | 7500 | 95 | 0 | 64 | 72 |
| CEx. 13 | Styrene | 2.1 | 0.5 | 38 | 80 | 9 | 90 | 68 |
| CEx. 14 | " | " | 50 | 3800 | 94 | 0 | — | — |

EXAMPLE 9

In the same way as in Example 1-(1), a propylene copolymer containing 0.72% by weight of a vinyl cyclohexane homopolymer polymerized in an amount of 3.0 g per gram of the titanium compound was obtained. The copolymer (10% by weight) and 90% by weight of a propylene/ethylene random copolymer having a melt index of 7.2 and an ethylene content of 3.2% by weight were kneaded by a Brabender, and the optical properties of the resulting composition were measured. The results are shown in Table 5.

COMPARATIVE EXAMPLE 15

A composition having the same ethylene content as the composition of Example 9 was prepared by blending 10% by weight of a propylene homopolymer having a melt index of 2.0 with the same propylene/ethylene random copolymer used in Example 9. The optical properties of a press sheet formed from the composition were measured, and the results are shown in Table 5.

The resulting composition had a higher haze and LSI than the composition of Example 9 containing polyvinyl cyclohexane, and exhibited poor transparency.

EXAMPLES 10 TO 13 AND COMPARATIVE EXAMPLES 16 TO 26

Using the titanium trichloride catalyst (a product of Marubeni-Solvay Co., Ltd.) and diethyl aluminum chloride, three copolymers (A)-1, (A)-2 and (A)-3 shown below were prepared.

Copolymer (A)-1

Obtained by homopolymerizing vinyl cyclohexane in an amount of 1 g per gram of the titanium trichloride catalyst in a first step, and homopolymerizing propylene in an amount of 752 g per gram of the titanium trichloride catalyst in a second step.

Copolymer (A)-2

Obtained by homopolymerizing 3-methylbutene-1 in an amount of 0.31 g per gram of the titanium trichloride catalyst in a first step and homopolymerizing propylene in an amount of 199 g per gram of the titanium trichloride catalyst in a second step.

Copolymer (A)-3

Obtained by homopolymerizing 3-methylpentene-1 in an amount of 1.2 g per gram of the titanium trichloride catalyst, in a first step, and homopolymerizing propylene in an amount of 800 g per gram of the titanium trichloride catalyst in a second step.

Each of these copolymers was blended with a propylene homopolymer having a melt index of 2.0, a propylene/ethylene random copolymer (MI 8.4, ethylene content 5.4% by weight) or a propylene/n-butene-1 random copolymer (melt index: 3.0, butene content: 19% by weight) in the proportions shown in Table 4. The properties of the resulting compositions were measured, and the results are shown in Table 5.

TABLE 4

| | Copolymer (A) | Propylene Homopolymer | Propylene/ Ethylene Copolymer | Propylene/ Butene-1 Copolymer |
|---|---|---|---|---|
| | | Unit: % by weight | | |
| Example 10 | (A)-1 20 | — | 80 | — |
| Comparative Example 16 | — | 20 | 80 | — |
| Comparative Example 17 | (A)-2 20 | — | 80 | — |
| Comparative Example 18 | (A)-3 20 | — | 80 | — |
| Example 11 | (A)-1 20 | 50 | — | 30 |
| Example 12 | (A)-1 70 | — | — | 30 |
| Comparative Example 19 | — | 70 | — | 30 |
| Comparative Example 20 | (A)-2 20 | 50 | — | 30 |
| Comparative Example 21 | (A)-2 70 | — | — | 30 |
| Comparative Example 22 | (A)-3 20 | 50 | — | 30 |
| Comparative Example 23 | (A)-3 70 | — | — | 30 |
| Example 13 | (A)-1 20 | — | — | 80 |
| Comparative Example 24 | — | 20 | — | 80 |
| Comparative Example 25 | (A)-2 20 | — | — | 80 |
| Comparative Example 26 | (A)-3 20 | — | — | 80 |

TABLE 5

| Example (Ex.) or Comparative Example (CEx.) | Composition | | | | | Optical Properties | | | | | Flexural Modulus (kg/cm$^2$) |
|---|---|---|---|---|---|---|---|---|---|---|---|
| | Vinyl Compound of copolymer (A) | Vinyl Compound (wt. ppm) | [η] (dl/g) | α-Olefine Copolymerized (wt %) | Haze (%) | Internal Haze (%) | LSI (%) | Total Light Transmittance (%) | Internal Total Light Transmittance (%) | Gloss (%) | |
| Ex. 9 | Vinyl cyclohexane | 720 | | Ethylene | 2.9 | 28 | 3 | 85 | | 102 | |
| CEx. 15 | — | — | | " | 2.9 | 42 | 27 | 86 | | 91 | |
| Ex. 10 | vinyl cyclohexane | 270 | 1.8 | " | 4.3 | 36 | 25 | 7 | 78 | 74 | 11900 |
| CEx. 16 | — | — | 1.9 | " | 4.3 | 65 | 60 | 23 | 84 | 61 | 9800 |
| CEx. 17 | 3-Methyl-butene-1 | 310 | 1.7 | " | 4.3 | 66 | 59 | 4 | 83 | 70 | 10500 |
| CEx. 18 | 3-Methyl-pentene-1 | 300 | 1.9 | " | 4.3 | 70 | 66 | 4 | 86 | 76 | 10400 |
| Ex. 11 | Vinyl cyclohexane | 270 | 2.2 | n-Butene-1 | 5.7 | 46 | 38 | 6 | 80 | 77 | 11200 |
| Ex. 12 | Vinyl cyclohexane | 930 | 2.0 | " | 5.7 | 34 | 24 | 7 | 77 | 89 | 15300 |
| CEx. 19 | — | — | 2.2 | " | 5.7 | 68 | 62 | 24 | 84 | 63 | 10900 |
| CEx. 20 | 3-Methyl-butene-1 | 310 | 2.1 | " | 5.7 | 83 | 81 | 3 | 87 | 64 | 12100 |
| CEx. 21 | 3-Methyl-butene-1 | 1100 | 1.8 | " | 5.7 | 83 | 81 | 3 | 82 | 69 | 11100 |
| CEx. 22 | 3-Methyl-pentene-1 | 300 | 2.2 | " | 5.7 | 79 | 78 | 4 | 87 | 66 | 11800 |
| CEx. 23 | 3-Methyl-pentene-1 | 1000 | 2.3 | " | 5.7 | 80 | 78 | 3 | 84 | 67 | 12300 |
| Ex. 13 | Vinyl cyclohexane | 270 | 2.1 | " | 15.2 | 34 | 24 | 5 | 79 | 83 | 91 | 10100 |
| CEx. 24 | — | — | 2.2 | " | 15.2 | 60 | 55 | 13 | 83 | 84 | 74 | 8100 |
| CEx. 25 | 3-Methyl-butene-1 | 310 | 2.1 | " | 15.2 | 68 | 63 | 3 | 85 | 90 | 66 | 9200 |
| CEx. 26 | 3-Methyl-pentene-1 | 300 | 2.0 | " | 15.2 | 71 | 69 | 3 | 86 | 90 | 67 | 8400 |

It is seen from the above results that the propylene polymer compositions containing polyvinyl cyclohexane had excellent rigidity and optical properties. On the other hand, the compositions containing poly-3-methylbutene-1 or poly-3-methylpentene-1 showed some improvement in rigidity, gloss and transmittance, but had a large haze, and therefore, was unsatisfactory for practical application.

EXAMPLE 14

A polypropylene composition was prepared from 100 parts by weight of a propylene/ethylene block copolymer having a melt index of 45 and a flexural modulus of 12,000 kg/cm$^2$ (the propylene homopolymer portion 75% by weight) and 0.5 part by weight of the vinyl cyclohexane/propylene copolymer obtained in Example 7. The flexural modulus of the composition was found to be 13,400 kg/cm². The inclusion of only 7 wt. ppm of the vinyl cyclohexane polymer gave a propylene polymer composition having very high crystallinity.

EXAMPLE 15

A propylene copolymer composition containing 500 weight ppm of vinyl cyclopentane was obtained in the same way as in Example 7 except that vinyl cyclopentane was used instead of vinyl cyclohexane. This composition had a haze of 39% and an LSI of 0.4%.

While the invention has been described in detail and with reference to specific embodiments thereof, it will be apparent to one skilled in the art that various changes and modifications can be made therein without departing from the spirit and scope thereof.

What is claimed is:

1. A crystalline propylene polymer composition comprising a blend of a crystalline polypropylene with a polymer of a vinyl cycloalkane having at least 6 carbon atoms, said composition containing 0.05 weight ppm to 10,000 weight ppm of the vinyl cycloalkane unit.

2. A composition of claim 1, wherein said crystalline polypropylene is a homopolymer of propylene.

3. A composition of claim 1, wherein said crystalline polypropylene is a random copolymer of propylene with another α-olefin having 2 to 18 carbon atoms.

4. A composition of claim 1, wherein said crystalline polypropylene is a block copolymer of propylene with another α-olefin having 2 to 18 carbon atoms.

5. A composition of claim 1, wherein said polymer of vinyl cycloalkane is a homopolymer of a vinyl cycloalkane having at least 6 carbon atoms.

6. A composition of claim 1, wherein said polymer of vinyl cycloalkane is a block copolymer of a vinyl cycloalkane having at least 6 carbon atoms with an α-olefin.

7. A composition of claim 6, wherein said α-olefin is propylene.

8. A composition of claim 1, wherein said vinyl cycloalkane is vinyl cyclobutane, vinyl cyclopentane, vinyl-3-methyl cyclopentane, vinyl cyclohexane, vinyl-2-methyl cyclohexane, vinyl-3-methyl cyclohexane, or vinyl norbornane.

9. A composition of claim 8, wherein said vinyl cycloalkane is vinyl cyclopentane or vinyl cyclohexane.

10. A composition of claim 1, wherein said composition contains 0.5 weight ppm to 5,000 weight ppm of the vinyl cycloalkane unit.

* * * * *